US012682673B1

(12) United States Patent
Floyd et al.

(10) Patent No.: US 12,682,673 B1
(45) Date of Patent: Jul. 14, 2026

(54) SYSTEMS AND METHODS FOR ENHANCED COMPUTER REPORT GENERATION

(71) Applicant: CENTRALSQUARE TECHNOLOGIES, LLC, Lake Mary, FL (US)

(72) Inventors: Lane Floyd, Lewisville, TX (US); Preston Willis, Shreveport, LA (US)

(73) Assignee: CENTRALSQUARE TECHNOLOGIES, LLC, Lake Mary, FL (US)

(*) Notice: Subject to any disclaimer, the term of this patent is extended or adjusted under 35 U.S.C. 154(b) by 0 days.

(21) Appl. No.: 19/328,098

(22) Filed: Sep. 12, 2025

Related U.S. Application Data

(60) Provisional application No. 63/830,672, filed on Jun. 26, 2025.

(51) Int. Cl.
*G06V 30/41* (2022.01)
*G06F 16/3329* (2025.01)
*G06F 40/205* (2020.01)

(52) U.S. Cl.
CPC ........ *G06V 30/41* (2022.01); *G06F 16/33295* (2025.01); *G06F 40/205* (2020.01)

(58) Field of Classification Search
None
See application file for complete search history.

(56) References Cited

U.S. PATENT DOCUMENTS

| | | | |
|---|---|---|---|
| 2024/0006039 A1* | 1/2024 | Ferrando | G06F 40/174 |
| 2025/0045855 A1 | 2/2025 | Clague | |
| 2025/0181420 A1* | 6/2025 | Talavera | G06F 9/5083 |
| 2026/0044911 A1* | 2/2026 | Encarnacion | G06Q 50/18 |

* cited by examiner

*Primary Examiner* — Eddy Cheung
(74) *Attorney, Agent, or Firm* — Finnegan, Henderson, Farabow, Garrett & Dunner, LLP

(57) ABSTRACT

The present invention discloses report generation systems and methods for gathering, reviewing, and extracting investigation data and generating, sending, and storing reports. In some embodiments, the system uses at least one processor. In some embodiments, the processor is configured to access investigation evidence and data, parse the contents of the investigation evidence, transmit the investigation evidence and data to a centralized repository, generate at least one investigation report using a machine learning algorithm, and securely store the investigation report in a central repository. In some embodiments, the method for creating and storing reports further includes accessing investigation evidence and data, parsing content of the investigation evidence, transmitting the investigation data to a centralized repository, generating at least one investigation report using a machine learning algorithm, and securely storing the investigation report in the centralized repository.

21 Claims, 7 Drawing Sheets

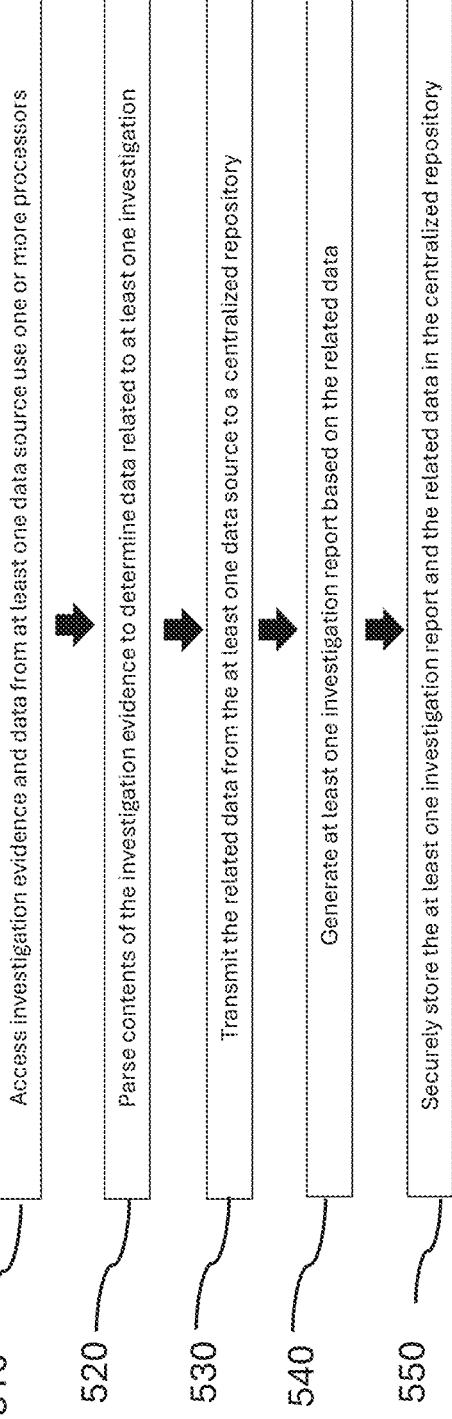

500

510 Access investigation evidence and data from at least one data source use one or more processors 520 Parse contents of the investigation evidence to determine data related to at least one investigation 530 Transmit the related data from the at least one data source to a centralized repository 540 Generate at least one investigation report based on the related data 550 Securely store the at least one investigation report and the related data in the centralized repository

FIG. 5A

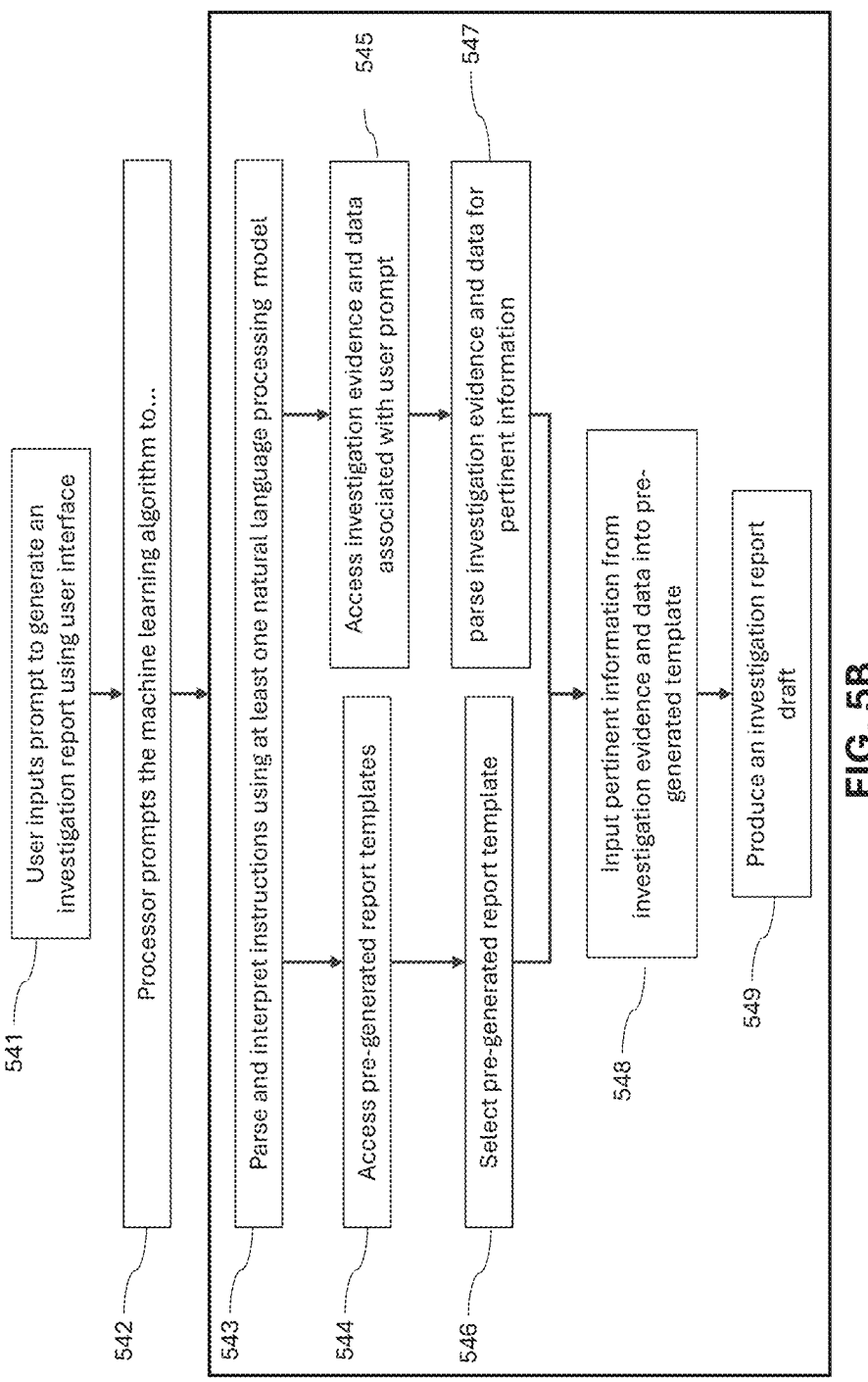

User inputs prompt to generate an investigation report using user interface
541

Processor prompts the machine learning algorithm to...
542

Parse and interpret instructions using at least one natural language processing model
543

Access investigation evidence and data associated with user prompt
545 parse investigation evidence and data for pertinent information
547

Access pre-generated report templates
544

Select pre-generated report template
546

Input pertinent information from investigation evidence and data into pre-generated template
548

Produce an investigation report draft
549

FIG. 5B

SYSTEMS AND METHODS FOR ENHANCED COMPUTER REPORT GENERATION

CROSS REFERENCE TO RELATED APPLICATIONS

This application claims the benefit of priority of U.S. Provisional Patent Application No. 63/830,672, filed on Jun. 26, 2025, which is incorporated herein by reference in its entirety.

TECHNICAL FIELD

The present disclosure relates to systems and methods for data administration and report generation powered by artificial intelligence algorithms. More specifically, without limitation, this disclosure relates to digitally accessing, extracting, and reviewing investigation data from disparate sources, generating reports using the data, and securely sharing the data and reports with people within an organization.

BACKGROUND

For law enforcement officers, data management, data review, and report drafting are some of the most important tasks for conducting thorough and comprehensive investigations following a law enforcement incident. Traditionally, law enforcement officers are tasked with reviewing all the documents and evidence associated with an investigation, pulling all the pertinent information from the documents and evidence, drafting the associated reports, and circulating the reports for review of the information and subsequent reports generated. However, when an investigation involves reviewing multiple documents and sources of information and generating and circulating multiple reports, many issues may arise. These issues may include missing pertinent information in the evidence reviewed, increased turnaround time for reports, reduced time for other pending assignments and deadlines, and increased likelihood of mistakes within reports, all of which may reduce the comprehensiveness of the investigation.

During document management and report drafting, law enforcement officers must find time to conduct investigations and create the associated documents and investigation reports. Because the amount of evidence available and the location and source of evidence for an investigation may vary between investigations and may be updated between reviews based on additional information and evidence, the time needed to complete the evidence collection, review, and report generation may vary. Evidence may also be stored in multiple disparate locations in a variety of formats, making it difficult to identify correlations and relationships. Additionally, as law enforcement officers often type their own investigation reports, there may be a lack of consistency between investigation reports and an increased likelihood of grammatical and spelling errors.

Once an investigation report draft is generated, law enforcement officers may then distribute their investigation reports for review. To do so, individual investigation reports are often sent to each person expected to review the investigation report. While this process may be digitized to simplify review via email and other data sharing methods, because emails and other data sharing methods often lack workflow control and consolidation, each reviewer is editing an individual copy of an investigation report and likely cannot view the edits made by other reviewers, the report generator may be left with multiple versions of a single investigation reports with differing or overlapping sets of feedback and no way to organize and track previously addressed comments, further extending the investigation and investigation report finalization process. Additionally, because of the need to send multiple versions of the generated investigation reports, the opportunity for accidental distribution of potentially confidential information and investigation reports to uninvolved parties is increased.

In summary, during a law enforcement investigation, obtaining the relevant investigation evidence and data, conducting thorough reviews on documents, obtaining all pertinent information from the documents, generating comprehensive investigation reports, and having secure and efficient investigation report reviews are essential to completing comprehensive and well-rounded investigations. However, voluminous amounts of data from disparate sources and formats, tight timelines, competing duties, and at times inefficient report management processes may make it difficult for law enforcement officers to complete well-rounded investigation reports and filings, making comprehensive investigations more difficult to achieve. Therefore, a solution is needed to simplify and streamline the evidence review and report generation process, allowing for more efficient report management and providing law enforcement officers more time for other pressing tasks and responsibilities. The disclosed systems and methods provide solutions to at least the aforementioned problems.

The disclosed systems and methods provide a solution for investigation inefficiencies. The disclosed embodiments provide a solution that allows a user to gather, parse, and review data, and generate and review reports using artificial intelligence. Through machine learning and generative learning algorithms, the user can easily access all related data related to a given investigation and generate an investigation report using the relevant data. By streamlining the data review and report generation process, the disclosed systems and methods for report generation optimization reduce the time required to review, generate, and approve investigation reports and the chance of unintentional disclosure of sensitive information or limited availability causing reduced report completion. This also ensures that data is consistently interpreted and presented, resulting in fewer disparities, faster decision making and case resolution, and enhancing data security and compliance, with, for example, confidentiality protocols.

SUMMARY

For overcoming the above-mentioned issues, the present disclosure discloses individualized systems and methods for simplifying the investigation report generation process using artificial intelligence algorithms.

In some embodiments, the system may include at least one processor. In some embodiments, the processor may be configured to access investigation evidence and data from at least one data source, parse content of the investigation evidence, transmit the related data from the at least one data source to a centralized repository, based on the related data, generate at least one investigation report using at least one machine learning algorithm, wherein the machine learning algorithm is configured to use a natural language processing model and at least one of an image recognition model or a predictive model to structure the related data in the at least one investigation report, securely store the at least one investigation report and the related data in the centralized repository.

According to some embodiments, the processor may be further configured to send the at least one investigation report to at least one user associated with the at least one investigation.

According to some embodiments the system may be accessed by a remote user device.

According to some embodiments, the processor may restrict access to investigation evidence and generate investigation reports through unique identifiers associated with at least one user.

According to some embodiments, data may be protected using a secure storage restriction process through a password-encrypted system.

According to some embodiments, the at least one data source may include at least one of a records management (RM) system or a computer aided dispatch (CAD) system.

According to some embodiments, the processor may be further configured to use a machine learning algorithm to parse the investigation evidence.

According to some embodiments, the machine learning algorithm may be configured to use natural language to parse the investigation evidence.

According to some embodiments, the machine learning algorithm may be configured to transcribe video data.

According to some embodiments, the processor may be configured to use a generative learning algorithm, to generate the at least one investigation report.

According to some embodiments, the generative learning algorithm may be further configured to receive an input prompt containing one or more instructions, use one or more language models to process the input prompt, and generate a response to the input prompt using the one or more language models.

According to some embodiments, the input prompt may be a verbal command from a system user.

According to some embodiments, the processor may be further configured to generate one or more report templates for use in generating the at least one investigation report.

According to some embodiments, the processor may be configured to use a generative learning algorithm to update the one or more report templates.

According to some embodiments, the processor may be further configured to receive user feedback from one or more feedback channels and update the at least one investigation report based on the user feedback.

According to some embodiments, the processor may be further configured to generate at least one workflow, the at least one workflow may be configured to review and approve the at least one investigation report.

According to some embodiments, the processor may be further configured to manage the at least one workflow to track approval of the at least one investigation report.

According to some embodiments, the processor may be further configured to track pending workflows.

According to some embodiments, the processor may be further configured to track updates made to the at least one investigation report associated with the at least one investigation.

According to some embodiments, the processor may be further configured to track tasks associated with the at least one investigation report associated with the at least one investigation.

According to some embodiments, the processor may be configured to restrict access to the at least one investigation report based on a completion status of at least one required training program.

According to some embodiments, the processor may be configured to access training programs associated with at least one organization, track the training programs completed by at least one system user, and conduct training and accreditation using the training programs of the at least one organization.

In some embodiments, the method for creating and storing reports comprises accessing investigation evidence and data from at least one data source, parsing the contents of the investigation evidence to determine data related to at least one investigation, transmitting the related data from the at least one data source to a centralized repository, based on the related data, generating at least one investigation report, using at least one machine learning algorithm, wherein the machine learning algorithm is configured to use a natural language processing model and at least one of an image recognition model or a predictive model to structure the related data in the at least one investigation report, and securely storing the at least one investigation report and the related data in the centralized repository.

According to some embodiments, an artificial intelligence algorithm may be used to create and track workflows for review of the at least one investigation report.

It is to be understood that the foregoing general description and the following detailed description are exemplary and explanatory only and are not restrictive of the disclosed embodiments.

BRIEF DESCRIPTION OF DRAWING(S)

The accompanying drawings, which are incorporated in and constitute a part of the specification, illustrate disclosed embodiments, and together with the description serve to explain the disclosed embodiments.

FIG. 5A illustrates an embodiment of an exemplary flowchart for using the disclosed investigation report generation system, consistent with disclosed embodiments.

FIG. 5B illustrates an embodiment of an exemplary flowchart diagram for generating an investigation report draft, consistent with disclosed embodiments.

DETAILED DESCRIPTION

Reference will now be made in detail to exemplary embodiments, discussed with reference to the accompanying drawings. Unless otherwise stated, technical and/or scientific terms have the meaning commonly understood by one of ordinary skill in the art. The disclosed embodiments are described in sufficient detail to enable those skilled in the art to practice the disclosed embodiments. It is to be understood that other embodiments may be implemented and that changes may be made without departing from the scope of the disclosed embodiments. For example, unless otherwise indicated, method steps disclosed in the figures may be rearranged, combined, or divided without departing from the envisioned embodiments. Similarly, additional steps may be added, or steps may be removed, without departing from the envisioned embodiments. Thus, the materials, methods, and examples are illustrative only and are not intended to be necessarily limited.

The foregoing description is presented for purposes of illustration. It is not exhaustive and is not limited to precise forms or embodiments disclosed. Modifications and adaptations of the embodiments will be apparent from consideration of the specification and practice of the disclosed embodiments. While certain components have been described as being coupled to one another, such components may be integrated with one another or distributed in any suitable fashion.

As discussed elsewhere herein, law enforcement investigations are often limited by the time and effort required to review investigation evidence and data, generate investigation reports, and review said investigation reports in a secure and centralized manner. This is especially true when an investigation involves multiple documents, formats and data sources that law enforcement officers must review to obtain relevant information. The present disclosure discloses a report generation system that gathers, reviews, and extracts law enforcement investigation data and generates, circulates and stores reports securely. The present disclosure also allows for evidence data and reports to be secured and accessible only to prescribed persons, preventing the potential for inadvertent disclosure of confidential information to persons uninvolved in a particular investigation.

Figure 1:
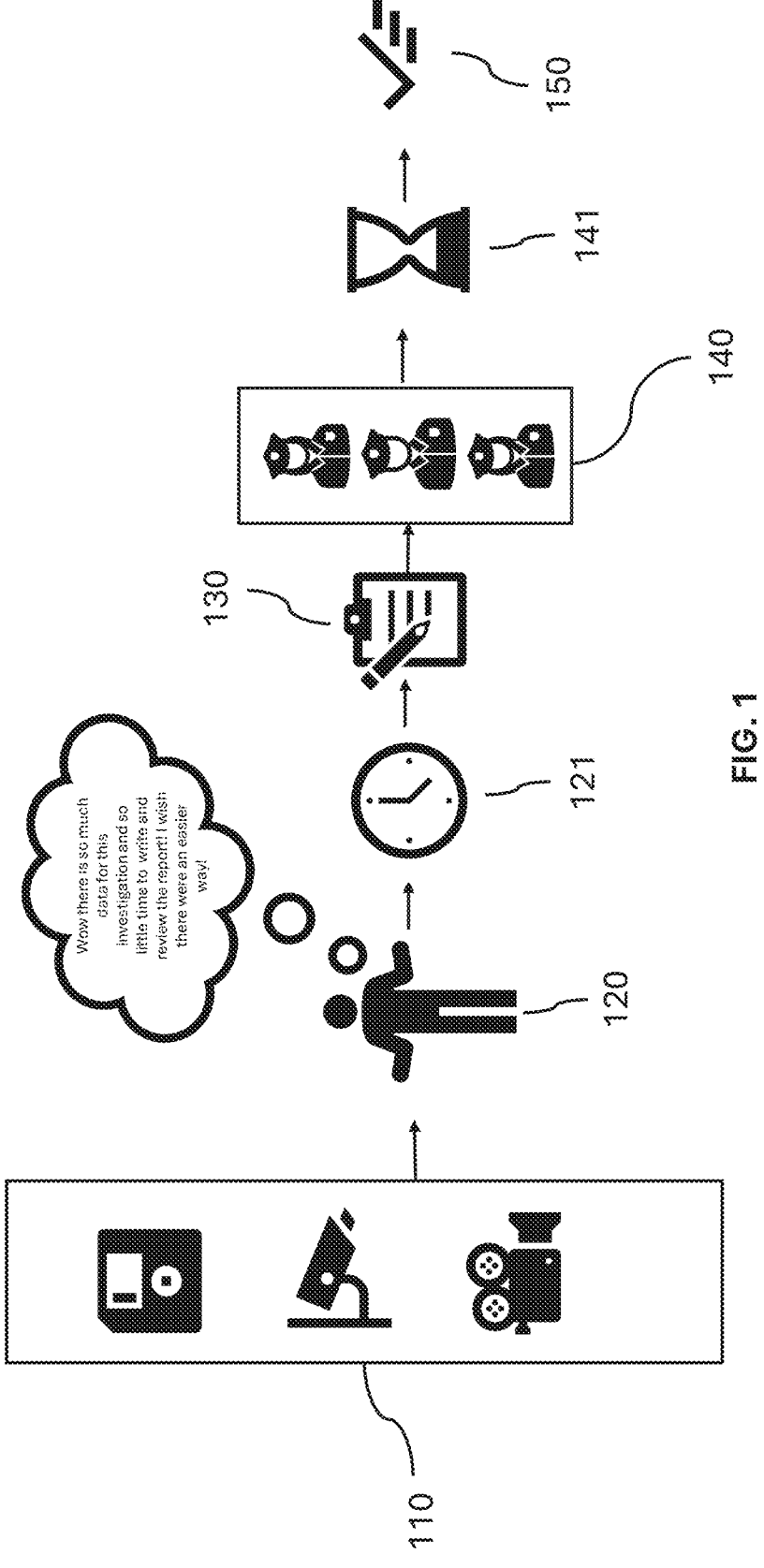
FIG. 1 illustrates a law enforcement officer desiring a system capable of simplifying the investigation report generation process.

FIG. 1 illustrates law enforcement officers 120, who may be responsible for conducting investigations and documenting investigation reports desiring a simpler and more straightforward way to conduct investigations and generate reports 130. In the law enforcement report generation process, law enforcement officers 120 may track down all the available investigation evidence data 110 associated with a law enforcement investigation. Law enforcement officers 120 must then review all the available evidence and generate reports 130 associated with the investigation. Reports 130 may include all documents generated during an investigation by a law enforcement agency. Reports 130 may include at least one of a subpoena, warrants, incident reports, arrest reports, crime reports, accident reports, and investigation reports.

Investigation evidence data 110 may be any information associated with an investigation. Investigation evidence data 110 may be readily accessible to law enforcement officers 120 or may need to be obtained from different repositories within the law enforcement data storage ecosystem. Due to this, investigation evidence data 110 may be vast, overlapping, and complex. Additionally, because of the vastness and complexity of data, report generation may be tedious and time intensive 121, creating a need by law enforcement officers 120 for a system to improve the report generation process.

Investigation evidence data 110 may encompass all information recorded and available to a law enforcement team in relation to an incident that may produce an investigation. Investigation evidence data 110 may include information related to or including at least one of the nature of the incident (e.g., robbery, assault, homicide), one or more documents, one or more photographs (e.g., images), one or more videos (e.g. body camera footage and interrogation room recordings), one or more voice recordings, one or more tangible objects collected, and one or more written statements. For example, investigation evidence data 110 may include metadata, which may include geolocation information associated with the incident. In some embodiments, investigation evidence data 110 may be generated by devices associated with law enforcement officers on the scene as well as devices associated with emergency response teams and third parties.

During a report generation process, law enforcement officers 120 obtain all available and relevant investigation evidence data 110. Because of the varying complexity of investigations and the need to satisfy other pressing time commitments, it may be difficult for law enforcement officers 120 to review all of the available investigation evidence data 110, making the report generation process even more tedious and time intensive 121. Once a draft of reports 130 is generated, law enforcement officers 120 may send reports 130 and all relevant investigation evidence data to relevant people or users within the law enforcement ecosystem 140 (e.g., law enforcement personnel, authorized and/or authenticated individuals and/or devices) to review for accuracy and completeness. When sending the reports, law enforcement officers 120 must ensure the evidence is not accessible to law enforcement officers and third parties that should not have unauthorized access to the data. However, because investigation reports may be sent through physical copy or through email, both methods of which have limited security protocols, there is an increase likelihood of unauthorized access to reports 130 and relevant investigation evidence data 110.

Once investigation evidence data 110 and reports 130 are received by relevant persons 140, the relevant persons 140 may then review the reports and the investigation evidence for completion, errors, and accuracy prior to document finalization 150. The review process may require the reviewer to be aware of the facts associated with the investigation. Thus, relevant persons 140 may have to closely review investigation evidence data 110, which may extend the time necessary for review and approval 141. Also, as there may be multiple relevant persons 140 reviewing investigation evidence data 110 and reports 130 at the same time, law enforcement officers 120 may have to handle and rectify multiple versions of a given report, further extending the time necessary for review and approval 141. This may make the process of finalization of the report increasingly time intensive and inefficient.

While these traditional methods were previously used to ensure the immediate receipt of evidence data and related reports to the intended recipients, these methods present multiple issues. They are inefficient, require much tracking and reviewing of work between different versions, different officers writing reports, and cannot easily be updated based on updated evidence or information. In addition, these methods may not be secure and thus may pose security issues. In addition, with multiple officers or persons involved in updating and changing the reports, there may be no way to track which information was added, by whom, and when. Thus, if the evidence data and reports are accessed, there may be limited tracking capability of who is accessing potentially sensitive information. Additionally, because the evidence data may be vast and in multiple formats, there is an opportunity for human error, which may result in sensitive information becoming available to unintended parties. Such data breaches may impact the integrity of law officer led investigations. Therefore, there is a need for a solution that addresses each of these issues.

Figure 2:
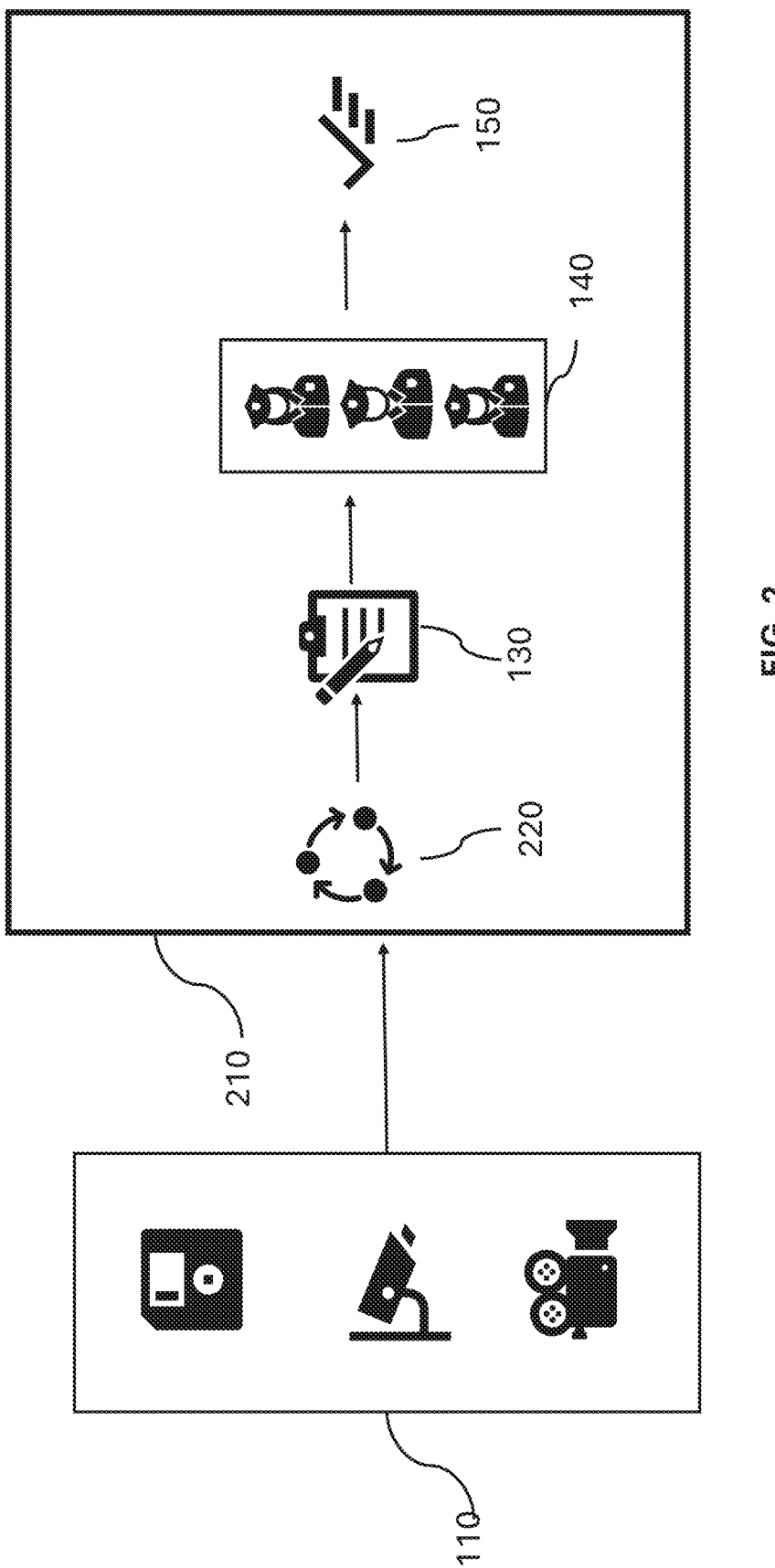
FIG. 2 illustrates an exemplary solution for simplifying the investigation report generation process.

FIG. 2 illustrates an exemplary solution for improving the report generation process using artificial intelligence algorithms, consistent with the disclosed embodiments. FIG. 2 illustrates a system 210 used concurrently with the process depicted in FIG. 1, configured to streamline, validate, and more reliably perform report generation and review tasks, thereby simplifying the process of report generation and review depicted in FIG. 1. System 210 may collect and/or receive investigation evidence data 110 associated with at least one investigation. System 210 may then review and extract the relevant evidence data 220. This review and extraction may be based on the evidence data's importance to the investigation considering previously conducted investigations. Specifically, feature engineering techniques that identify relevant variables and patterns in the source data, domain-specific parameters set by an administrator, or automated selection algorithms that prioritize information based on statistical relevance and contextual importance to the investigation may be used to determine what evidence data is extracted, as discussed herein.

When the data received is in different formats, system 210 may reconcile and normalize the data through automated format conversion, scheme alignment and metadata tagging to ensure compatibility with downstream report generation processes. This includes transforming structure and unstructured data into a unified machine-readable format to allow for consistent analysis. System 210 may then generate reports 130 based on investigation evidence data 110 reviewed and prior relevant investigations and reports generated. System 210 may use machine learning algorithms as discussed herein to detect patterns in the available data and associate it with the facts of an open investigation. While multiple machine learning algorithms may be referred to below, it is appreciated that embodiments may be likewise deployed while utilizing a single machine learning algorithm. System 210 may share reports 130 with relevant persons 140 tasked with review and approval of reports 130 and investigation evidence data 110. System 210 may also consolidate and centralize the review process to prevent the use and review of multiple versions of reports 130. To prevent versioning issues, system 210 may consolidate and centralize the investigation report review process by retaining a single editable version of reports 130 and maintaining version history tracking to ensure that reviewers are accessing the most current and authoritative version of reports 130.

The sharing of reports 130 and associated data, and the review for document finalization 150 may be completed within system 210. In doing so, system 210 may restrict access to reports 130 and investigation evidence data 110 using role-based permissions and secure authentication protocols. Reports 130 and investigation evidence data 110 may be shared only with authorized persons 140, and all interactions may be logged to ensure traceability and compliance. The centralized review and approval process within system 210 may eliminate the risk of conflicting edits or outdated versions by enforcing real-time synchronization and locking mechanisms during collaborative review sessions. Furthermore, system 210 may leverage historical data patterns and prior investigation outcomes to guide reviewers in identifying key evidence, validating conclusions, and ensuring consistency across similar cases. Thus, through system 210, reports 130 and investigation evidence data 110 may be generated, secured, reviewed, approved, and managed in a manner that enhances reliability, transparency, and operational efficiency.

Figure 3A:
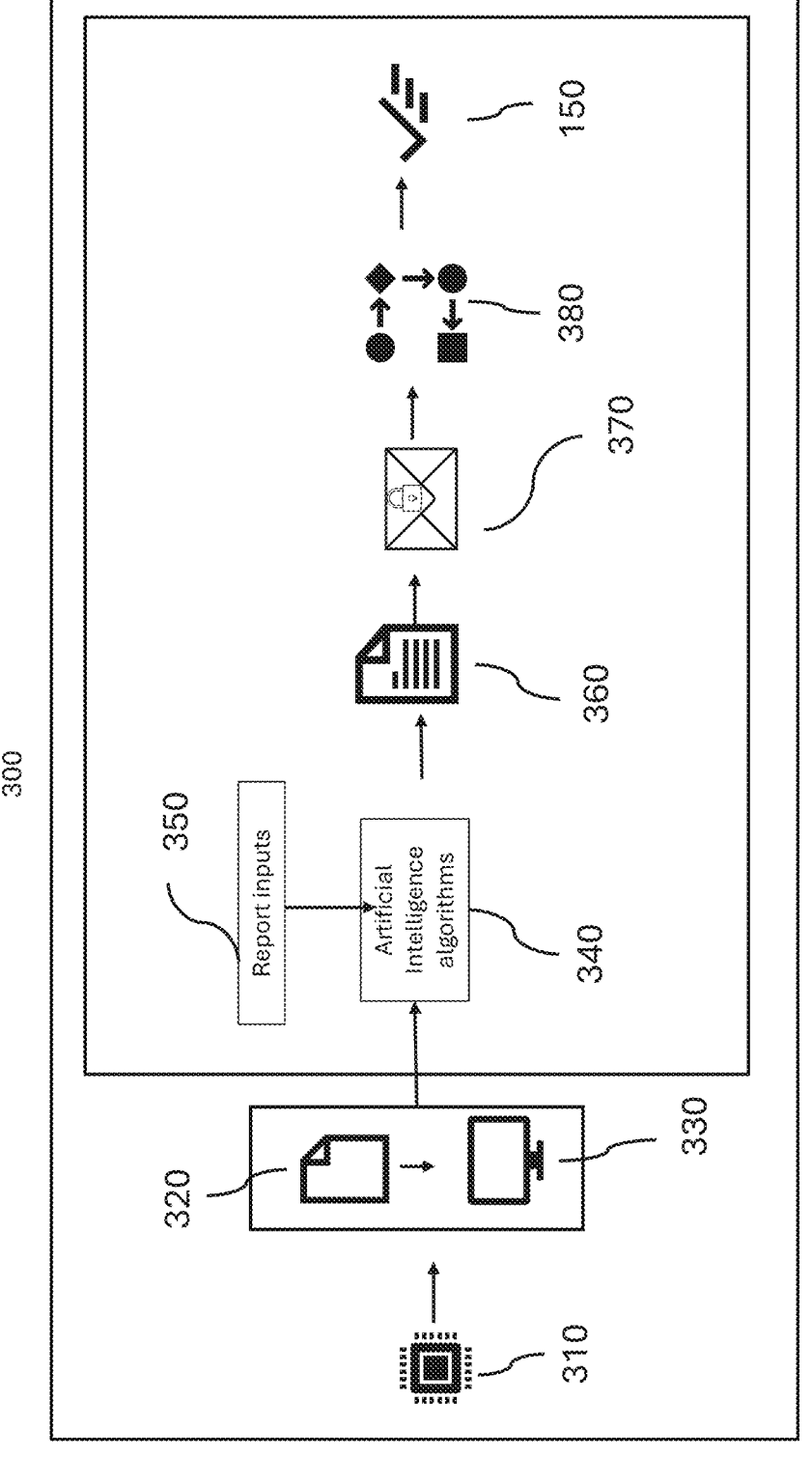
FIG. 3A illustrates an embodiment of an exemplary system for using the disclosed investigation report generation system, consistent with disclosed embodiments.

FIG. 3A is a schematic diagram illustrating one embodiment of a system 300 for using the disclosed report generation system powered by artificial intelligence algorithms, according to some embodiments. In some embodiments, system 300 may include at least one processor 310, data 320, a data source 330, one or more artificial intelligence algorithms 340, report inputs 350, a report generation device 360, data security device 370, and a workflow management device 380. While processor 310, data 320, data source 330, one or more artificial intelligence algorithms 340, report inputs 350, report generation device 360, data security device 370, and workflow management device 380 are shown within a single system 300, it is appreciated that any combination of these devices and components may exist outside of system 300, including within one or more additional systems 300. Devices and/or systems may be communicably connected to one another through one or more networks, such as a local area network (LAN), a wide area network (WAN), and/or the Internet.

Processor 310 may be configured to execute commands of any device of system 300. For example, any or all of report generation device 360, data security device 370, and workflow management device 380 may each include at least one processor 310. In some embodiments, the functionality of multiple devices may be combined within a single device, which may have at least one processor configured to implement the functionality. A processor may be any type of computing device capable of executing instructions. While operations below may be described using the passive voice (e.g., "a machine learning algorithm may be used"), it is appreciated that these operations may be performed or executed by processor 310.

A processor, such as processor 310, may include any physical device or group of devices having circuitry configured to perform one or more logic operations on an input or inputs. For example, processor 310 may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. Processor 310 may include more than one processor and may take the form of, but is not limited to, a microprocessor, embedded processor, or the like, or may be integrated in a system on a chip (SoC). Furthermore, according to some embodiments, processor 310 may be from the family of processors manufactured by Intel®, AMD®, Qualcomm®, Apple®, NVIDIA®, or the like. The processor may also be based on the ARM architecture, a mobile processor, or a graphics processing unit, etc. The disclosed embodiments are not limited to any type of processor. In some embodiments, processor 310 may be communicably connected with at least one memory device, such as memory 410, further described with respect to FIG. 4, which may store instructions executable by the processor to perform a process. System 300 may be configured to carry out all or a portion of process 500, discussed herein.

Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively and may be co-located or located remotely from each other. The processors may be coupled electrically, magnetically, optically, or by any other way that permits them to interact with each other.

Data source 330 may refer to at least one file (e.g., digital or physical file) or device that contains, collects, acquires, stores, or manages data. In some embodiments, processor 310 gathers data from data source 330. In some embodiments, data source 330 may include multiple sources of data or multiple formats of data. For example, data source 330 may include both files and devices. Data source 330 may include at least one of one or more relational databases (e.g., MySQL, Oracle Database, Microsoft SQL Server), one or more noSQL databases (e.g., MongoDB, Redis), one or more cloud-based databases (e.g., Google Cloud Firestore, Microsoft Azure), one or more in-memory databases (e.g., Redis, SAP HANA), one or more file systems (e.g., NTFS, HFS+, ext4), one or more columnar databases (e.g., Amazon Redshift, Apache Cassandra), one or more graph databases (e.g., Neo4j, Amazon Neptune), or one or more distributed databases (e.g., Apache Cassandra, MongoDB). Data source 330 may be added, removed, or updated at any stage of the system or method described herein. In some embodiments, data source 330 may be software-based and may not require any specified hardware support. In some embodiments, data source 330 may store investigation evidence and data generated and stored by data security device 370 as discussed below.

It is to be appreciated that data source 330 may also include data 320, which may include investigation evidence data 110 as described with respect to FIG. 1. In other embodiments, data 320 may include information received from and/or generated by internet of things (IoT) devices, drones, cameras, sensors, or any other source of information. Data 320 may be in the form of structured data, unstructured data, real-time data, and/or historical data. The formatting of data 320 may depend on data source 330. Non-limiting examples of formats of data 320 may include CSV, JSON, XML, XMS, SHP, PDF, JPEG, PNG, SQL, MOV, WMV, Flash, MP4, MPG, Raw, MP3, WAV, AAC, or any means of formatting data. Formats of data 320 may include compressed formats and/or uncompressed formats. In some embodiments, at least a portion of data 320 may be encrypted and/or password protected.

In some embodiments, data source 330 may involve computer-aided dispatch (CAD) systems, CAD-to-CAD systems, and other systems. A CAD system may refer to a system used by emergency call centers or dispatch centers to manage and coordinate emergency response activities. CAD systems, in some embodiments, involve dispatching emergency responders and/or receiving information from various sources including emergency call centers. In some embodiments, CAD systems may be integrated with call handling systems used in emergency call centers. For example, when an emergency call is received from a call center, call handlers input relevant information regarding the incident into the call handling system. The information input into the call handling system (e.g., nature of emergency, location, caller details) may then be transmitted to the CAD system.

In some embodiments, CAD systems may be configured to receive data from Automatic Call Distribution (ACD) systems. ACD systems, in some embodiments, may be systems that automatically route incoming emergency calls to available call takers. In some embodiments, ACD systems transmit call data, including caller location and call type, directly to the CAD system in real-time.

In other embodiments, CAD systems utilize standardized data sharing protocols to receive information from external sources, including emergency call centers. For example, CAD systems may integrate with Public Safety Answering Points (PSAPs) using protocols such as the National Emergency Number Association's (NENA) standard for data exchange between PSAPs and CAD systems.

In some embodiments, CAD systems receive and process information from text-to-911, multimedia processing, or any other form of communication to emergency call centers. Emergency call centers, in some embodiments, may transmit text messages, images, videos, and any other multimedia data directly to the CAD system. CAD systems, in some embodiments, may also receive information through other communication channels such as phone calls, mobile apps, online forms, video calls, next generation 911 systems, social media platforms, teletypewriter (TTY) devices, relay services, or any other means of sending information to emergency officials or emergency call centers. It is to be appreciated that multimedia data, in some embodiments, may be sent directly to the CAD system in real-time.

In some embodiments, data 320 may include CAD data from CAD systems. For example, data 320 may include the name of the caller, contact information of the caller, and history of previous calls or incidents associated with the caller. In further embodiments, CAD data may involve details about allocated resources and assignments. For example, CAD data may include information related to the units dispatched to the incident, assigned tasks or roles for responders, and status updates on resource availability and deployment. In other embodiments, CAD data may include geospatial data relayed from a caller. In some embodiments, CAD data may include records of communication between emergency callers, dispatchers, and responders such as voice communications (e.g., dispatch audio recordings), text messages, data transmissions, image recordings, video recordings, logs of radio transmissions and dispatch messages, and the like. CAD data, in some embodiments, may include incident history information. For example, CAD data may include records of past incidents and responses including historical incident data for analysis and reporting as well as trends and patterns in incident types, locations, and response times. It is to be appreciated that the aforementioned information related to CAD data does not need to originate from CAD or involve CAD systems. In some embodiments, data 320 stored in data source 330 may involve any type of information related to an emergency or an event regardless of whether that information was reported to CAD.

In some embodiments data source 330 may include records management (RM) systems. RM systems may refer to a system that creates, stores, organizes, manages, secures, and accesses records, data, and documents. RM systems, in some embodiments, may be used to store law enforcement data and records. In some embodiments, RM systems may be in the form of a software as a service, a cloud-based system, physical file systems, or computer-based servers. In some embodiments, RM systems may contain investigation evidence data 110 as described with respect to FIG. 1. Non-limiting examples of RM systems may include Box, DocuPhase, Microsoft Sharepoint, Revver, OpenText Extended ECM, NewgenONE, and Laserfiche.

One or more artificial intelligence algorithms 340 may include any computational model or system that enables one or more machines to autonomously perform complex tasks, such as learning from data, identifying patterns, adapting to new inputs, and solving problems. In some instances, one or more artificial intelligence algorithms 340 may simulate human learning, comprehension, problem solving, language, decision-making, and autonomy. In some embodiments, one or more artificial intelligence algorithms 340 may be used through computer software or physical hardware that is locally or non-locally stored. Non-limiting examples of artificial intelligence algorithms 340 may include machine learning algorithms and generative learning algorithms.

Machine learning algorithms may be a set of computational procedures and statistical techniques used to enable a computer to learn from, identify patterns of, and make predictions of data without explicit programming. In some embodiments, data may include data 320, as discussed herein. In some embodiments, machine learning algorithms may identify patterns, trends, and relationships within a dataset and use that information to improve the performance of the report generation system over time. It is appreciated that machine learning algorithms may be one or more machine learning algorithms. The one or more machine learning algorithms may perform tasks simultaneously or sequentially from one another.

In some embodiments, machine learning algorithms may include supervised learning algorithms, unsupervised learning algorithms, reinforcement learning algorithms, semi-supervised learning algorithms, and deep learning algorithms. Further, machine learning algorithms may include linear regression, logistic regression, decision trees, random forest, neural networks, or clustering algorithms. In some embodiments, machine learning algorithms are specialized based on tasks such as classification, regression, clustering, or rule learning. In some embodiments, machine learning algorithms involve natural language processing, speech recognition, image recognition, computer vision, reinforcement learning, or dimensionality reduction. Natural language processing may be a type of machine learning algorithms that, when deployed, enable computing devices to recognize, understand, interpret, predict, and respond to human language. For example, natural language processing may be used to extract entities, identify sentiments, classify text segments, and generate summaries from unstructured data such as witness statements or body camera transcripts.

In some embodiments, machine learning algorithms translate audio language data using natural language processing or other speech recognition techniques into a different language (e.g., translating audio in Spanish to English audio). In some embodiments, machine learning algorithms translate audio language data using natural language processing or other speech recognition techniques into written transcripts. It is appreciated that machine learning algorithms may also be configured to translate spoken or written words from video and body camera footage into different languages.

In some embodiments, the machine learning algorithms implement feature engineering techniques, to select or create relevant features that will be used by a machine learning model. A machine learning model may be a computer program or software able to predict and decide without explicit programing, using algorithms. In some embodiments, specialized hardware accelerators (e.g., GPUs and TPUs) may be used to enhance the machine learning algorithm's accuracy and performance. Machine learning algorithms may or may not be physically integrated into hardware. Some disclosed embodiments may be software-based and may not require any specified hardware support. In some embodiments, the machine learning algorithms are implemented in software and run on the processor 310. For example, the machine learning algorithms may be implemented in software (e.g., using Python, R, Java).

In some embodiments, the machine learning algorithms may be trained based on a dataset. Training machine learning algorithms may involve collecting a dataset (e.g., from data source 330) that includes input features and corresponding target values. The collected dataset may be split into two parts (i.e., a training set and a testing set). The training set may be used to train the machine learning algorithm, and the testing set may be used to evaluate the machine learning algorithm's performance. Machine learning algorithms may make predictions on the training data using the current model parameters. The current model parameters may be the internal values and data that machine learning algorithms may use to define how the machine learning algorithms make predictions. The machine learning algorithms may calculate the loss or error between predicted values and actual target values, where the loss represents the degree of difference between the machine learning algorithm's predictions and the actual target values. In some embodiments, back propagation may be used to update the machine learning algorithm's parameters in the direction that reduces loss.

Further, optimization machine learning algorithms may minimize the degree of difference between its predicted values and the actual target values by iteratively adjusting the model parameters. For example, during training, machine learning algorithms may adjust their internal parameters to learn the patterns and relationships between input features and output labels. In some embodiments, training the machine learning algorithms may involve iterative optimization and model evaluation.

In some embodiments, machine learning algorithms may be configured to access and parse investigation evidence, data sources (such as data source 330), databases (e.g. database 420 as discussed with respect to FIG. 4), or other sources of data (e.g., files, application programming interfaces (APIs), web services). Processor 310 may use software applications or scripts to process and extract relevant information from raw data (e.g., gathered data). For example, processor 310 may use data extraction scripts, ETL processes, or customized programs to extract information from gathered data. In some embodiments, processor 310 may deploy machine learning algorithms (e.g., natural language processing, image processing, database queries, data filtering, data aggregation) to extract specific information from gathered data, as discussed herein. In some embodiments, an administrator may determine parameters that cause the machine learning algorithms to extract the data, override the extraction process, or override data that has been extracted. In some embodiments, processor 310 prompts the machine learning algorithms to extract investigation information using feature engineering techniques. For example, feature engineering may be used to engineer relevant features that capture investigation information based on source data.

Feature engineering refers to devices, systems, and methods for selecting, creating, or transforming features (e.g., source data) to improve performance of machine learning algorithms. For example, feature engineering may involve analyzing source data (e.g., a dataset) and identifying relevant variables, understanding variable distributions, and recognizing patterns and relationships with data. In some embodiments, feature selection involves choosing the most relevant features from the source data based on domain knowledge, statistical techniques, or automated feature selection algorithms. In some embodiments, feature engineering involves feature creation where new features from existing variables or data sources are generated. In some embodiments, feature creation involves mathematical transformations, interaction terms, binning, discretization, or encoding categorical variables into numerical representations. Feature creation may be conducted using generative learning algorithms as discussed herein.

In some embodiments, feature engineering involves normalizing numerical and scaling features (e.g., zero mean, zero-unit variance, or scaling to a predefined range). Feature engineering may also be used for dimensionality reduction, to reduce the number of features while preserving important features. In some embodiments, machine learning algorithms extract and display features such as audio transcripts of calls and videos, tasks associated with specific investigations, or frequency of incidents by location or person from source data using feature engineering.

In some embodiments, the machine learning algorithms may detect and identify personal identifiable information within a video or audio recording. For example, the machine learning algorithms may leverage facial recognition and motion tracking algorithms to detect or associate data with a given person. Personal identifiable information may include a person's face, distinctive clothing, tattoos or other unique physical identifiers, distinct vocal patterns, personal items, medical record data, license plates, and visible addresses.

In some embodiments, the machine learning algorithms disclosed herein may scan and review investigation data to remove or redact personal identifiable information to protect or prevent the disclosure of personal information within a given set of data. For example, the machine learning algorithms may use facial recognition tools and motion tracking algorithms to identify individuals captured within body camera footage. The machine learning algorithms may then use identity redaction techniques to obscure the identifying features of a given person. Identity redaction techniques may include pixilation, blurring, content removal, character substitution, pseudonymization, and blackout redaction. Identity redaction techniques may be deployed to protect the privacy of individuals captured in investigation evidence and data to ensure compliance with data privacy regulations, such as the Health Insurance Portability and Accountability Act (HIPAA), the General Data Protection Regulation (GDPR), and other jurisdictional privacy laws.

In some embodiments, the machine learning algorithms may assess keyword triggers. Keyword triggers may refer to specific words or phrases, that when detected within a specific context, initiate a predefined action or response. For example, the machine learning algorithms may detect specific words and patterns in the words used by the speaker that prompt specialized response protocols (e.g., number of individuals involved, weapons, fault/liability, whether a Miranda warning was administered, or alibis). In some embodiments, the machine learning algorithms may use natural language processing or other speech recognition techniques to gather essential information from the speaker and make decisions. The decisions may include data extraction and use within an investigation report based on the content of an audio or video recording. The decision on whether data is extracted or used may be based on the relevance of the data, with the most relevant data being extracted and used. This determination may be based on feature engineering techniques that identify relevant variables and patterns in the source data, domain-specific parameters set by an administrator, or automated selection algorithms that prioritize information based on statistical relevance and contextual importance to the investigation. In some embodiments, the machine learning algorithms may include clustering algorithms for custom segmentation, wherein the audio or video content is grouped into distinct segments based on thematic similarity, speaker identity, emotional tone, or investigative relevance, allowing for more targeted data extraction and report generation.

In some embodiments, machine learning algorithms may label the gathered data. These labels may describe the gathered data. For example, machine learning algorithms may annotate the source data with labels that represent specific investigation information or details the user has tagged the machine learning algorithms to predict. In some embodiments, machine learning algorithms are trained on the labeled dataset using supervised learning techniques. Non-limiting examples of machine learning algorithms involve regression, classification, and clustering tasks. In some embodiments, machine learning algorithms may be evaluated based on performance metrics such as accuracy, precision, recall, cross-validation or mean squared error and used to improve the machine learning algorithms.

In some embodiments, machine learning algorithms may automatically detect, flag, and correct any potential data inconsistencies present within the investigation evidence and data. Data inconsistencies may be variances in the investigation evidence and data that impact the usability of the investigation evidence and data. Potential sources of data inconsistency may include data duplication, incomplete data, data formatting issues, data inaccuracy, data conflicts, and data integration issues. In some embodiments, machine learning algorithms may compare and validate the investigation data. The data comparison and validation process for an investigation may reference previously generated reports.

Generative learning algorithms may be a form of machine learning algorithms that may, using computer processes and systems, create novel outputs by learning from and mimicking data to generate novel content. This content may include but is not limited to text, images, videos, and reports. In some embodiments, the reports may be reports 130 as described with respect to FIG. 2. In some embodiments, generative learning algorithms use and analyze available data and identify representations to produce a specific output.

In some embodiments, the generative learning algorithms may generate centralized report templates for use with future reports. Centralized report templates may be standardized, generation report formats designed to streamline the documentation of investigation events. These templates may include predefined sections for key details such as event type, involved entities, timestamps, evidence summaries, and procedural notes. By leveraging generative learning algorithms, the templates may be automatically tailored to match the structure and content requirements of specific investigative contexts, in turn, ensuring consistency between reports. Creation of centralized report templates may streamline report generation using the generative learning algorithms. The centralized report templates may be used by law enforcement officers 120 or may be used by the report generation system to draft reports 130 for at least one investigation. In some embodiments, the generative learning algorithms may update the centralized report templates. These updates to the report templates may be based on changes or updates to the information required or requested to be included in an investigation report.

In some embodiments, the generative learning algorithms may be trained according to previously created investigation reports and investigation evidence and data. The generative learning algorithms may be validated by using previously collected investigation evidence and data, and verifying output consistency against expected investigation report formats and user instructions. The validation process may be recompleted on a predetermined schedule, using newly generated investigation reports and investigation evidence and data. Once the generative learning algorithms are trained and validated, they may be used to make predictions or classifications on new investigation data that has not been assessed by generative learning algorithms. In some embodiments, generative learning algorithms may predict the investigation evidence and data necessary for a given investigation or investigation report. Generative learning algorithms may determine what investigation evidence and data is necessary for a given investigation or investigation report by analyzing historical investigation patterns, correlating data types with investigation outcomes, and applying learned associations between evidence categories and investigation report structures.

In some embodiments, the generative learning algorithms may analyze audio and video recordings from body camera footage and other sources of video data. Generative learning algorithms may be used to transcribe spoken statements and video data and extract key details associated with an investigation. Generative learning algorithms may distinguish between key details versus non-key details by applying techniques such as contextual relevance modeling. Semantic weighting and temporal correlation analysis. These techniques enable the generative learning algorithms to evaluate the importance of spoken statements or visual cues based on their proximity to investigative milestones, the presence of named entities (e.g., suspects, witnesses, locations), and their alignment with known case parameters. For example, a statement identifying a suspect's location during a critical time window may be classified as a key detail, while unrelated background conversation or ambient noise may be filtered out as non-key.

After analyzing audio and video recordings and extracting key details associated with an investigation, the generative learning algorithms may then generate an investigation report draft using the previously extracted investigation details. An investigation report draft may be the investigation report generated by the generative learning algorithms prior to review and approval as discussed herein. The generative learning algorithms may use report generation device 360 to generate the investigation report draft.

In some embodiments, the generative learning algorithms may use the extracted key details associated with an investigation to produce a summary of an investigation event separate from the investigation report draft. For example, the generative learning algorithms may analyze the investigation data available for a given investigation to produce a summary for an investigation event. An investigation event may be a discrete occurrence or activity within the broader scope of an investigation, such as a witness interview, evidence collection or forensic analysis. Generative learning algorithms may then generate a narrative style summary of the investigation event that highlights the core elements of an investigation. The core elements of an investigation may include the time and date of the event, the parties involved, the nature of the event, the sequence of events, immediate findings such as potential offenses committed or potentially implicated laws where relevant, and actions taken. In some embodiments the generative learning algorithms may periodically update the summaries generated as new investigation data is produced for a given investigation.

In some embodiments, the report generation system may allow law enforcement officers to review and edit the generated investigation report drafts created by machine learning algorithms for accuracy and provide feedback on the generated investigation report drafts. In some embodiments, the machine learning algorithms as discussed herein may be used to access the updates, changes, and feedback to reports from the law enforcement officers to improve current and subsequent investigation report drafts generated within the report generation system.

In some embodiments, the machine learning algorithms may be configured to receive input prompts from a user through a user interface, as discussed herein. These input prompts may be verbal, textual, or visual data, and contain instructions from the user to prompt the machine learning algorithms to perform a task. In other embodiments, the machine learning algorithms may proceed automatically. The machine learning algorithms may utilize one or more language models to process, interpret and respond to the user input prompts. In some embodiments, the language models may be stored in a memory or database storage location accessible to the machine learning algorithms. The memory or database storage location may be memory 410 or database 420 respectively as discussed with respect to FIG. 4. In some embodiments, the machine learning algorithms may be generative learning algorithms that may be trained to review, process, and respond to user prompts as discussed herein.

In some embodiments, machine learning algorithms may be used to complete searches, which may enable the user to locate information contained within the investigation data of a given investigation. This search functionality may be integrated into the user interface of the report generation system. A user interface may be the point where a user interacts with a device, software, or website. For example, a user of the report generation system may interact with the system through a software platform.

In some embodiments, the machine learning algorithms may be configured to accept natural language queries or structured keyword inputs. Upon receiving a query, the machine learning algorithms may parse the request and identify relevant data points across multiple sources, including incident reports, body camera footage transcripts, witness statements, and forensic records.

Conducting searches using machine learning algorithms may deploy a combination of semantic indexing and entity recognition models, wherein the system may retrieve contextually relevant information even when the query terms do not exactly match the stored data. For example, a user searching for "suspect vehicle description" may receive results that include tagged metadata from surveillance footage, officer notes, and dispatch logs. The system may also rank the search results based on relevance, source credibility, and temporal proximity to the investigation event. Semantic indexing may be a method of organizing and retrieving information based on the meaning and context of the content using machine learning algorithms. Entity recognition models may be natural language processing tools that automatically identify and categorize information into predetermined classes of data.

Machine learning algorithms may allow law enforcement officers to complete law enforcement training courses and accreditation. The training courses may be related to data analysis and investigation report generation for law enforcement investigations. The training courses may include Commission on Accreditation for Law Enforcement Agencies (CALEA), Commission of Accreditation for Corrections (CAC), and the National Commission on Correctional Health Care (NCCHC). In some embodiments, to gain access to the report generation system, the investigation evidence and data and the generated investigation reports, a user may be required to complete certain training courses and accreditation. These training courses may be established by the organization using the report generation system. By requiring training courses and accreditation completion prior to system access, organizations can ensure that users possess the necessary knowledge to interpret data accurately, ensure compliance with legal and procedural standards, and provide an additional security layer for accessing investigation evidence and data and investigation reports. This can help mitigate risks associated with data security, data management, and unauthorized access, enhancing the overall integrity and reliability of the investigative process.

Report inputs 350 may include all investigation evidence and data necessary to generate an investigation report draft. In some embodiments, report inputs 350 may include the date and time of the incident, crimes associated with the incident, potential suspects and witnesses, and relevant investigation details about the event that should be documented (e.g., location of the incident and statement made by parties, suspects, and witnesses). In some embodiments, the report generation system may be configured to flag missing or unavailable report inputs 350 that are necessary for inclusion in the investigation report draft. In some embodiments, the report generation system may incorporate machine learning algorithms to determine which report inputs 350 are necessary for generating an investigation report draft. The determination of whether report inputs 350 are necessary may depend on factors including, but not limited to, the type of investigation report generated, the subject of the investigation report, and the information included in previously generated investigation reports.

Report generation device 360 may be a computer program or software configured to access data sources associated with an investigation and generate at least one investigation report associated with the investigation. In some embodiments, report generation device 360 may be one or more machine learning algorithms, as discussed herein. In some embodiments, report generation device 360 may include machine learning algorithms.

Data security device 370 may be configured to secure and distribute investigation evidence and data and investigation reports based on one or more data access restrictions. Due to the nature of certain investigations, access to information including investigation evidence data 110 and reports 130 as discussed with respect to FIG. 1 may need to be restricted. In some embodiments, data security device 370 may restrict or limit access to investigation evidence and data and investigation reports while allowing and transmitting said investigation evidence and data and investigation reports to relevant persons 140 and/or authorized devices or digital accounts (e.g., accounts associated with relevant persons 140). Access to investigation evidence and data and investigation reports may be restricted or limited through the use of encryption protocols, password verification, role-based access controls, and time-based access windows. Encryption protocols may be rules within a program that convert readable information to an unreadable format to prevent unauthorized access to investigation evidence and data and investigation reports. Password verification may be an identity verification method that requires a user to provide one or more words or characters to verify the user's identity. Role based access controls may be a method of restricting access to evidence data based on a user's role within an organization. Time-based access windows may restrict access to investigation evidence and data and investigation reports to specific time periods, for example during business hours.

Relevant persons 140 may include law enforcement officers that are actively investigating a given case and may need access to the secure investigation evidence and data and investigation reports. In some embodiments, relevant persons 140 on a given case may be entered into the report generation system to moderate data access. Relevant persons 140 (and/or digital accounts, devices, applications, profiles, etc. associated therewith) may be added, removed or updated as required. The addition, removal, or updating of relevant persons 140 may be completed by a system operator through a secure interface provided by the report generation system. This secure interface may include authentication mechanisms to verify a user identity and authorization level prior to allowing that user to make changes. In some embodiments, changes to the list of relevant persons 140 may be logged and auditable, ensuring traceability and compliance with data governance policies. In some embodiments, addition, removal, or updating of relevant persons 140 may be automated based on case assignments, organizational role changes, or predefined access rules. In some embodiments, the automated process may use machine learning algorithms to update authorization of relevant persons 140.

In some embodiments, data security device 370 may generate a session identifier. A session identifier may be or include a unique identifier and/or token used to track a user's access and activity within the report generation system. In some embodiments, the session identifier may be in the form of an access or audit trail that documents user access tracking. For example, system 300 may link the unique identifier and/or token to any or all actions taken by a particular device or user and/or during a particular session. An access and audit trail may be or include a digital record that tracks user access data, if changes were made within a database or file, and/or what the changes were. In some embodiments, an access and audit trail may be unmodifiable by a device or user whose actions are tracked by the access and audit trail. Additionally, the access and audit trail may be unmodifiable by other devices or users. In some embodiments, the access and audit trail may be modifiable by a select subset of devices or users.

In some embodiments, the report generation system may be accessed using an application accessible to a computer or smart device. An application may be a program designed to perform specific tasks for a user, such as accessing the report generation system. A smart device may include any device that is configured to connect to the internet or other network. A smart device may be in the form of a smartphone or tablet. The computer or smart device may use one or more servers to access the report generation system. In some embodiments, any of the one or more servers may be server 430 as discussed with respect to FIG. 4.

In some embodiments, data security device 370 may be encompassed within the report generation system or may be a third-party data security application external of the report generation system. Non-limiting examples of third-party security applications include Amazon Web Services (AWS) GovCloud, Azure Government, and Google Distributed Cloud Host.

In some embodiments, data security device 370 may allow digital collaboration functionality and data sharing. Digital collaboration and data sharing may be a means by which data holders may securely share and transfer investigation evidence and data and investigation reports to third parties, such as through one or more application program interfaces (APIs) and/or digital encryption protocols like secure file transfer protocols (SFTP), file transfer protocol secure (FTPS), hypertext transfer protocol secure (HTTPS), transport layer security (TLS), managed file transfer (MFT), and virtual private networks (VPNs). In some embodiments, data security device 370 may operate an application or program configured to convert data to an output interpretable by a third-party device (e.g., according to at least one known parameter of the third-party device) and/or convert received data into a format processable by system 300.

Workflow management device 380 may be configured to manage the review and approval process of investigation reports and their associated evidence data. In some embodiments, workflow management device 380 may enable collaborative document review and editing. Collaborative document review and editing may allow relevant persons 140 to review, edit, and approve a single document, reducing the need to review multiple versions of the same document. A document may include reports 130 and investigation evidence data 110 as discussed with respect to FIG. 1. In some embodiments, the report generation system may track the edits made, review, and approval process of at least one investigation report. Additionally, the report generation process may provide guidance and content to reviewers to improve the review process. The report generation process may accomplish this using machine learning algorithms that may produce suggestions for updates or corrections using historical investigation reports.

In some embodiments, the investigation approval process may be an automated process. The automation may include predefined workflows that route investigation evidence and data and investigation reports to designated reviewers based on roles, permissions, or subject matter expertise. Notifications and reminders on the status of an investigation report may be automatically triggered to ensure timely review and approval. Additionally, workflow management device 380 may log timestamps, user actions, and decision outcomes to maintain a comprehensive audit trail. This audit trail may be used for compliance verification, quality assurance, and future reference.

The report generation system may track edits, review, and approval by maintaining a version-controlled audit trail that logs all modifications, timestamps, and user identifiers associated with each change. This audit trail may be stored in a secure repository and may be accessible only to authorized personnel. Personnel authorization may be established external of the report generation system and may be entered into the system as role-based permissions. In some embodiments, the report generation system may generate workflow status indicators to indicate where an investigation report is in the approval workflow process. For example, the report generation system may assign workflow statuses such as pending review, rejected, approved, or revisions requested.

In some embodiments, workflow management device 380 may be encompassed within the report generation system or may be a third-party workflow management application external of the report generation system. Non-limiting examples of third-party management applications include Click Up, Zapier, Hive, Asana, Wrike, and Monday.com.

Figure 3B:
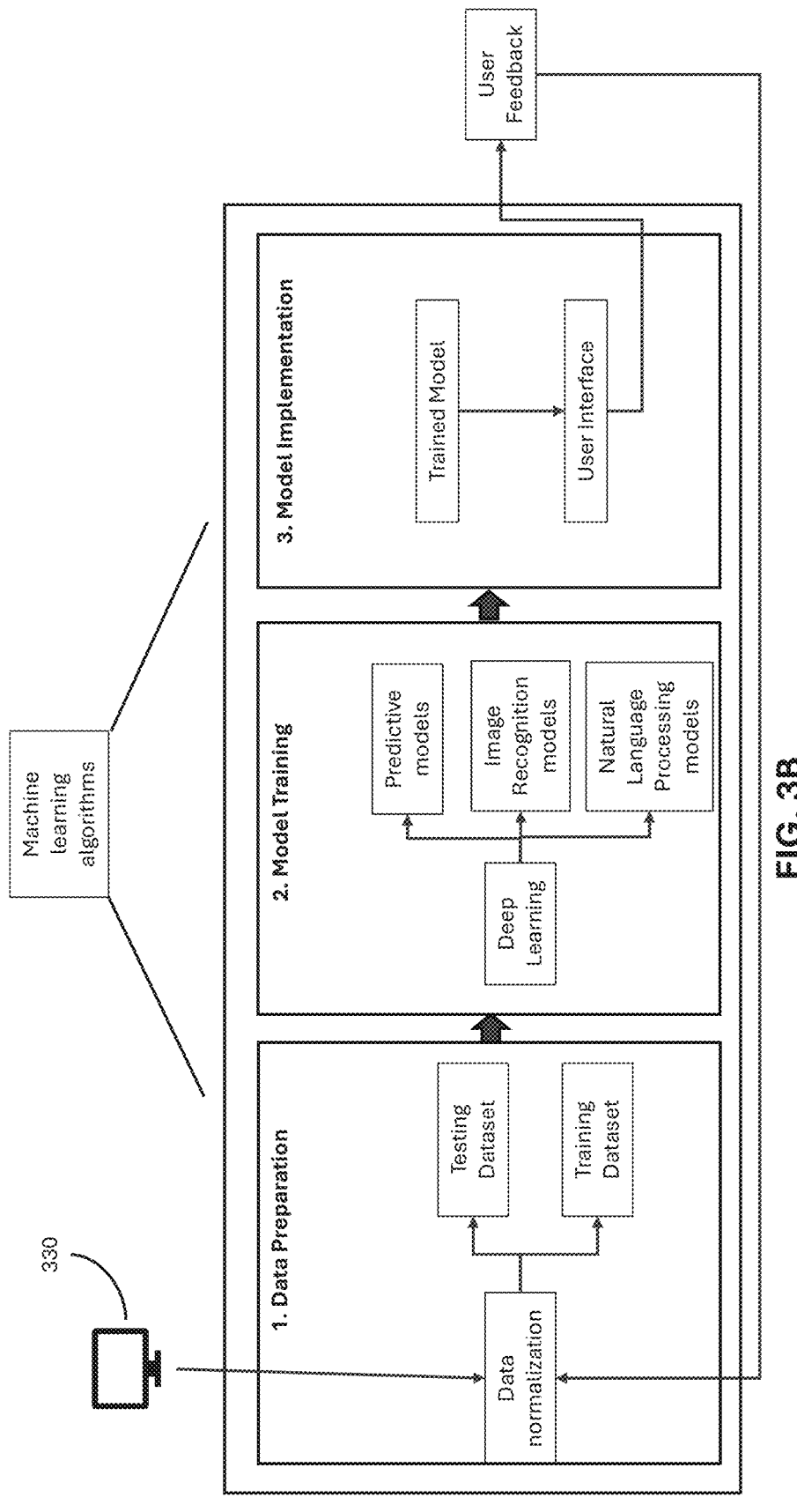
FIG. 3B illustrates a flowchart diagram of an exemplary embodiment of machine learning algorithms, consistent with disclosed embodiments.

FIG. 3B is a flowchart diagram illustrating an exemplary embodiment of machine learning algorithms, consistent with disclosed embodiments. In some embodiments, the machine learning algorithms of FIG. 3B may be a version of artificial intelligence algorithms 340 as discussed with respect to FIG. 2. The machine learning algorithms as depicted may include three primary stages: data preparation, model training, and model implementation.

In some embodiments, the system may begin with the data preparation stage. During the data preparation stage, a machine learning algorithm may access the available investigation evidence for data for scrubbing and standardization. In some embodiments, the investigation evidence and data may be accessed from data source 330 as discussed with respect to FIG. 3A. The machine learning algorithms may normalize the data through automated format conversion, scheme alignment, and/or metadata tagging to ensure compatibility with downstream report generation processes as discussed herein. When the data has been normalized, the data may be separated into two datasets: the testing dataset and the training dataset. The training set may be used to train the machine learning algorithm, and the testing set may be used to evaluate the machine learning algorithm's performance.

In some embodiments, once the data has been separated into its datasets, the data may be used for machine learning model training. In some embodiments, the machine learning algorithms may use one or more deep learning systems to create perform model training. Deep learning systems may be or include a subset of machine learning algorithms that comprising a multi-layer neural network configured to receive input data and product responses based on the input data. In some embodiments the input data may data from the testing dataset and training dataset as discussed herein. In some embodiments, using the data in the datasets (e.g., the testing dataset and the training dataset), the deep learning systems may produce models that can create specific outputs based on the data received. These outputs may include predictive models, image recognitions models, and natural language processing models. A predictive models may be a model that is able to produce a new undefined output based on the accessible data. A image recognition model may be a type of deep learning model about to parse an image and determine the contents of the image. A natural language processing model may be a type of deep learning model that, when deployed, enable computing devices to recognize, understand, interpret, predict, and respond to human language.

In some embodiments, once the deep learning models have been produced, the trained deep learning models may be implemented within the user interface. Once implements, the processor may prompt the machine learning algorithms to solicit user feedback. This user feedback, may be used by the machine learning algorithms to further improve its downstream outputs.

Figure 4:
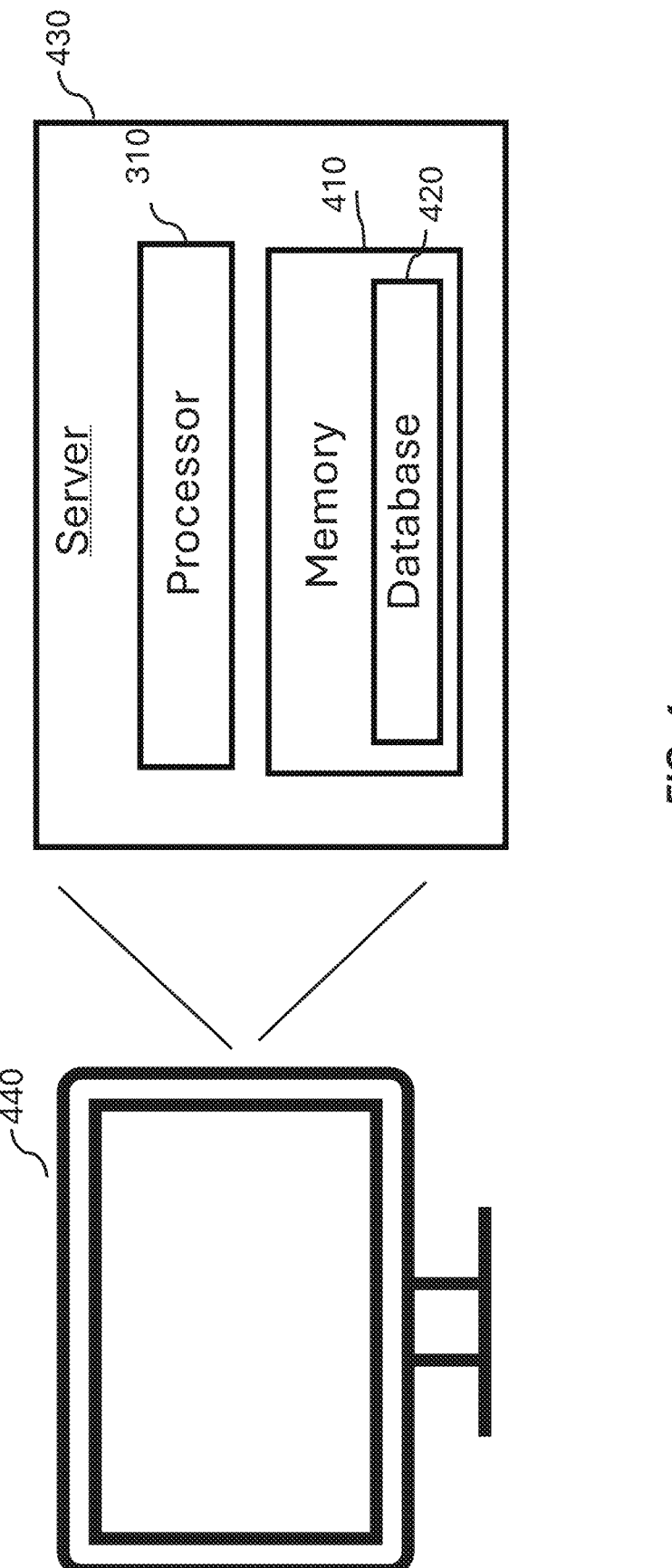
FIG. 4 illustrates a block diagram showing an exemplary server, consistent with disclosed embodiments.

FIG. 4 is a block diagram showing an exemplary server, consistent with disclosed embodiments. Server 430 may include one or more processor 310, one or more memory 410, and one or more databases 420. Server 430 may include any form of computing device configured to receive, store, and transmit data. In some embodiments, server 430 may be a digital device, and may be remote from devices that generate, receive, and/or process investigation evidence and data and investigation reports. For example, server 430 may be a server configured to store digital files accessible through a network (e.g., a web server, application server, virtualized server, etc.). Server 430 may be implemented as a Software as a Service (SaaS) platform through which software for auditing recorded user activity may be provided to an organization as a web-based service. While operations below may be described using the passive voice (e.g., "a machine learning algorithm may be used"), it is appreciated that these operations may be performed or executed by server 430.

In some embodiments, memory 410 may include one or more storage devices configured to store instructions used by processor 310 to perform functions related to server 430. In some embodiments, a device of the report generation system may include or have access to at least one memory component, and that memory component may store instructions executable by at least one processor. The disclosed embodiments are not limited to particular software programs or devices configured to perform dedicated tasks. For example, memory 410 may store at least one software program, such as a user-level application, that is configured to perform the functions associated with the disclosed embodiments. Additionally, processor 310 may, in some embodiments, execute one or more programs (or portions thereof) remotely located from server 430. Furthermore, memory 410 may include one or more storage devices configured to store data for use by the programs. Memory 410 may include, but is not limited to a Random Access Memory (RAM), a Read-Only Memory (ROM), a hard drive, a solid state drive, an optical disk, other permanent, fixed, or volatile memory, a CD-ROM drive, a peripheral storage device (e.g., an external hard drive, a USB drive, etc.), a network drive, a cloud storage device, or any other mechanism capable of storing instructions, which may be executable by at least one processor. In some embodiments, memory 410 may operate within a server 430 but separately from a database. In some embodiments, memory 410 may exist within one or more databases and/or outside of any database (e.g., in a local memory device, in random-access memory, etc.).

In some embodiments, database 420 may be part of, or communicably coupled to, a server, such as server 430. Database 420 may be included on a volatile or non-volatile, magnetic, semiconductor, tape, optical, removable, non-removable, or other type of storage device or tangible or non-transitory computer-readable medium. Database 420 may also be part of server 430 or separate from server 430. When database 420 is not part of server 430, server 430 may exchange data with database 420 via a communication link, such as a wired network connection, wireless network connection, or combination thereof. Database 420 may include one or more memory devices that store data and instructions used to perform one or more functions of the disclosed embodiments. Database 420 may include any suitable databases, ranging from small databases hosted on a workstation to large databases distributed among data centers. Database 420 may also include any combination of one or more databases controlled by memory controller devices (e.g., server(s), etc.) or software. For example, database 420 may include document management systems, Microsoft SQL™ databases, SharePoint™ databases, Oracle™ databases, Sybase™ databases, other relational databases, or non-relational databases, such as Mongo and others. In some embodiments, server 430 may include one or more input/output devices, communications devices, displays, and/or other interfaces (e.g., server-to-server, database-to-database, or other network connections). In some embodiments, server 430 may include at least one processor 310 as described herein.

[1] In some embodiments, server 430, processor 310, memory 410, and database 420 may be located internally or externally of computing device 440. Computing device 440 may be a machine capable of performing computations, processing information, and executing programs. Computing device 440 and its components may be programmed to perform operations and techniques or may include digital electronic devices such as one or more application-specific integrated circuits (ASICs) or field programmable gate arrays (FPGAs) that are programmed to perform operations and techniques. In some embodiments, the report generation system may be executed using computing device 440. Computing device 440 may be one or more desktop computer systems, portable computer systems, handheld devices, networking devices, or any other device that can incorporate hard-wired and/or program logic.

In some embodiments, computing device 440 may be controlled using one or more operating systems. Non-limiting examples of operating systems may include iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, computing device 440 may be controlled by a proprietary operating system. Operating systems may be a software program that may control and schedule computer processes for execution, perform memory management, provide file system networking, and system execution, such as execution of the report generation system.

FIG. 5A is a flowchart diagram illustrating one exemplary embodiment of process 500 for using the report generation system. System 300 as discussed with respect to FIG. 3 in the proceeding paragraphs may be operated to perform process 500 as described below. For example, at least one processor may execute instructions stored by at least one memory component, to perform one or more steps of process 500. The processor may be processor 310, as discussed with respect to FIG. 2. While the steps of process 500 are depicted and described in a particular order, it is appreciated that any or all of these steps may be re-ordered, omitted, duplicated, and/or repeated.

In some embodiments, in step 510, the report generation system may be launched and may access investigation evidence and data from at least one data source using one or more processors, such as processor 310. In some embodiments, the report generation system may be an application. In some embodiments, the report generation system may be accessed using a remote user device. A remote user device may allow a user to access and control a system—such as the report generation system—from a different physical location than that of the primary machine location. The remote user device may be in the form of a laptop, smartphone, or tablet. In some embodiments, the remote user device is computing device 440 as described herein.

In some embodiments, the report generation system may generate and display tasks associated with an investigation. This may include tasks such as generation of the investigation report, investigation review, and approval reminders. The report generation system may generate and manage tasks associated with an investigation by automatically assigning task owners, setting due dates based on investigation timelines, and triggering notifications or escalations when deadlines are approaching or missed. The system may also track task completion status and provide real-time updates to relevant people within an organization.

In some embodiments, at step 510, the report generation system may access the investigation evidence and data. Accessing the investigation evidence and data may include retrieving data from disparate sources such as body camera footage, surveillance video, mobile device recordings, closed-circuit television feeds, audio logs, and written witness statements. The process may use one or more processors to convert the retrieved data into a system-readable format, enabling uniform processing and integration across the report generation workflow. In some embodiments, investigation evidence and data may include investigation evidence data 110, as described with respect to FIG. 1.

In some embodiments the report generation system may convert the retrieved investigation evidence and data through data cleaning, data file adjustment, data decompression, or any other form of digital data conversion. In some embodiments data cleaning may include identifying data duplicates, removing data duplicates, identifying data errors, and/or correcting data errors. Data file adjustment may transform the data format to a predetermined, machine-intelligible format most compatible with the report generation system. Non-limiting compatible data formats may include CSV, XML, JSON, XMS, JPEG, PNG, PDF, SQL, or any other compatible format. Data decompression may be the process of restoring compressed data and files to their original form to allow access to the data.

The investigation evidence and data may be accessed from data source 330 as discussed with respect to FIG. 3. In some embodiments, data source 330 may be stored in database 420 as discussed with respect to FIG. 4.

In some embodiments, process 500 may include performing step 520. In some embodiments, step 520, may be performed after step 510. At step 520, the report generation system may parse the contents of the investigation evidence and data to discover data related to at least one investigation. In some embodiments, parsing the contents of the investigation evidence and data may refer to the process of analyzing and converting the investigation evidence and data into a format that is useable by machine learning algorithms.

In some embodiments, the investigation evidence and data determined to be relevant and related to the investigation is determined in step 520 as discussed herein. In some embodiments, the report generation system may further apply filtering and organizational logic to the accessed data, categorizing it into investigation-specific folders based on metadata such as incident type, location, timestamp, and involved parties. Sensitive information within the evidence—such as personal identifiable details—may be automatically redacted using embedded redaction protocols prior to storage as discussed herein.

In some embodiments, the machine learning algorithms may distinguish between relevant data related to and associated with an investigation and non-relevant evidence data that may be associated with but not related to an investigation. In some embodiments, the machine learning algorithms may distinguish between relevant and non-relevant data by using information analysis techniques such as natural language processing, semantic similarity scoring, entity recognition, and contextual relevance modeling. These techniques may allow the system to evaluate the content, metadata, and relational context of data artifacts to determine their investigative value. For example, the report generation system may use natural language processing to extract named entities and classify text segments. This function is useful in the relevance assessment as it may assist in flagging documents that mention individual or entities relevant to the investigation and reduce or remove generic language unnecessary for an investigation from being used within an investigation report.

Investigation evidence and data associated with but not related to at least one investigation may include previously mis-stored data, misnamed data, mis-labeled data (e.g., data including an identifier of a different investigation) or data that is obsolete in relation to at least one investigation. Investigation evidence data associated with and related to at least one investigation may include any information pertinent to an investigation, such as investigation evidence data 110 as discussed with respect to FIG. 1.

In some embodiments, process 500 may include performing step 530. In some embodiments, step 530 may be performed after step 520. At step 530, the report generation system may transmit the related data from at least one data source to a centralized repository. In some embodiments, the process of transmitting the relevant data may include converting the investigation evidence and associated metadata into a standardized, system-readable format prior to transmission. This conversion ensures compatibility with the centralized repository's indexing and retrieval protocols, enabling efficient storage and future access.

The transmission process may be executed over a secure communication channel, such as an encrypted file transfer protocol (SFTP) or a virtual private network (VPN), to ensure the confidentiality and integrity of the data during transit. In accordance with internal security policies, sensitive or confidential documents may be encrypted and password-protected before transmission.

In some embodiments, once received by the centralized repository, the data may be automatically categorized into investigation-specific folders based on metadata such as case number, incident type, or involved parties. Access to these folders may be restricted using role-based permissions, training restrictions, and person-specific requirements, ensuring that only authorized personnel can view or modify the contents. The system may also log all transmission events and access attempts for audit purposes, thereby maintaining a verifiable chain of custody for all investigation-related data.

In some embodiments, process 500 may include performing step 540. In some embodiments, step 540 may be performed after step 530. At step 540, the report generation system may generate at least one investigation report draft related to at least one investigation using machine learning algorithms. In some embodiments, the machine learning algorithms may be generative learning algorithms. In some embodiments the machine learning algorithms access and learn from prior reports generated within a law enforcement reporting system prior to generating a new investigation report for an investigation. The law enforcement reporting system may be the report generation system as discussed herein.

In some embodiments, the generated investigation report may be sent to at least one user associated with the generated investigation report. In some embodiments, a user may be required to complete training courses to be associated with a generated investigation report as discussed herein.

In some embodiments, process 500 may include performing step 550. In some embodiments, step 550 may be performed after step 540. At step 550, the report generation system may securely store the evidence data and generated investigation reports within a specific storage location, as discussed in step 540. In some embodiments, securing the investigation evidence and data may be conducted using data security device 370 as discussed with respect to FIG. 3. In some embodiments, the evidence data and generated investigation reports may be secured using passwords, user specific unique identifiers, multi-factor authentication (MFA), and/or data encryption. In some embodiments, configuring and securing the evidence data may be conducted using data security device 370 as discussed with respect to FIG. 3. In some embodiments, step 550 may include digitally signing evidence data for future authentication, such as authentication of the data itself, when the data was generated, and/or devices or users responsible for the generation of the data.

FIG. 5B is a flowchart diagram illustrating one exemplary embodiment of step 540 in process 500 as discussed herein. In some embodiments, some or all of the steps shown in FIG. 5B may be used to perform step 540. In some embodiments, at step 541, the user may input a prompt to generate an investigation report draft using the user interface of the report generation system as discussed herein. Completion of step 541 may be performed prior to the performance of step 542. At step 542, the processor may prompt the machine learning algorithms to execute one or more operations to generate an investigation report draft. In some embodiments, the processor may be processor 310, as discussed with respect to FIG. 2. In some embodiments, step 543 may be performed after step 542. At step 543, the machine learning algorithms may parse and interpret the instructions provided by the user using at least one natural language model. The natural learning model may be configured to extract entities, actions, and/or contextual parameters from the prompt to determine the scope and intent of the investigation.

In some embodiments, steps 544 and step 545 may be performed after step 543. At step 544, the processor may prompt the machine learning algorithms to access pre-generated report templates. The selection of pre-generated report templates access may be based on the machine learning algorithm interpretation of the user input prompt. At step 545, the processor may prompt the machine learning algorithms to access the investigation evidence and data relevant to the user prompt with relevance which may be determined by the investigation evidence and data's importance to the investigation considering previously conducted investigations as discussed herein.

In some embodiments steps 546 and 547 may be performed in tandem after steps 544 and 545 (or sequentially, in other embodiments). At step 546, the processor may prompt the machine learning algorithms to select an appropriate pre-generated report template to use to generate the investigation report draft based on the user input. In some embodiments, the pre-generate report template selected may be based on the pre-generated report templates selected for related investigations. The machine learning algorithms may identify these pre-generated report templates by reviewing previously conducted investigations and their associated investigation reports, as discussed herein. At step 547 the machine learning algorithms may analyze the investigation evidence and data retrieved during step 545 to determine what information is pertinent to the investigation report draft. This determination may be based on the relevance and importance of the data to the investigation, informed by patterns observed in prior investigations.

In some embodiments, step 548 may be performed after steps 546 and 546. At step 548, the processor may prompt the machine learning algorithms to populate the selected pre-generated template with the pertinent information identified in step 547.

In some embodiments, step 549 may follow step 548. At step 549, the processor may prompt the machine learning algorithms to generate the finalized investigation report draft. The user may then access the draft report through the user interface of the report generation system.

The foregoing description is presented for purposes of illustration. It is not exhaustive and is not limited to precise forms or embodiments disclosed. Modifications and adaptations of the embodiments will be apparent from consideration of the specification and practice of the disclosed embodiments. While certain components have been described as being coupled to one another, such components may be integrated with one another or distributed in any suitable fashion.

The disclosed embodiments may be implemented in a system, a method, and/or a computer program product. The computer program product may include a computer-readable storage medium (or media) having computer-readable program instructions thereon for causing a processor to carry out aspects (e.g., method steps) of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts described above. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions, which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions, which execute on the computer, other programmable apparatus, or other device implement the functions/acts specified in the flowchart and/or block diagram block or blocks.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of this disclosure are apparent from this detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. As used herein, unless specifically stated otherwise, being "based on" may include being dependent on, being interdependent with, being associated with, being defined at least in part by, being derived from, being influenced by, or being responsive to. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

What is claimed is:

1. A report generation system comprising:
at least one processor, the at least one processor configured to:
access investigation evidence and data from at least one data source;
parse content of the investigation evidence to determine data related to at least one investigation;
transmit the related data from the at least one data source to a centralized repository;
based on the related data, generate at least one investigation report using at least one machine learning algorithm, wherein the machine learning algorithm is configured to use a natural language processing model and at least one of an image recognition model or a predictive model to structure the related data in the at least one investigation report; and securely store the at least one investigation report and the related data in the centralized repository.

2. The system of claim 1, wherein the processor is further configured to send the at least one investigation report to at least one user associated with the at least one investigation.

3. The system of claim 1, wherein the system is accessed by a remote user device.

4. The system of claim 1, wherein the processor restricts access to investigation evidence and generated investigation reports through unique identifiers associated with at least one user.

5. The system of claim 4 wherein data is protected using a secure storage restriction process through a password-encrypted system.

6. The system of claim 1, wherein the at least one data source includes at least one of a records management (RM) system or a computer aided dispatch (CAD) system.

7. The system of claim 1, wherein the processor is configured to use a generative learning algorithm, to generate the at least one investigation report.

8. The system of claim 7, wherein the generative learning algorithm is further configured to:
receive an input prompt containing one or more instructions;
use one or more language models to process the input prompt; and
generate a response to the input prompt using the one or more language models.

9. The system of claim 8, wherein the input prompt is a verbal command from a system user.

10. The system of claim 1, wherein the processor is further configured to generate one or more report templates for use in generating the at least one investigation report.

11. The system of claim 10, wherein the processor is configured to use a generative learning algorithm to update the one or more report templates.

12. The system of claim 1, wherein the processor is further configured to:
receive user feedback from one or more feedback channels and update the at least one investigation report based on the user feedback.

13. The system of claim 1, wherein the processor is further configured to generate at least one workflow, the at least one workflow configured to review and approve the at least one investigation report.

14. The system of claim 13, wherein the processor is further configured to manage the at least one workflow to track approval of the at least one investigation report.

15. The system of claim 14, wherein the processor is further configured to track pending workflows.

16. The system of claim 1, wherein the processor is further configured to track updates made to the at least one investigation report associated with the at least one investigation.

17. The system of claim 1, wherein the processor is further configured to track tasks associated with the at least one investigation report associated with the at least one investigation.

18. The system of claim 1, wherein the processor is configured to restrict access to the at least one investigation report based on a completion status of at least one required training program.

19. The system of claim 18, wherein the processor is configured to:
access training programs associated with at least one organization;

track the training programs completed by at least one system user; and conduct training and accreditation using the training programs of the at least one organization.

20. A method for creating and storing reports comprising:

accessing investigation evidence and data from at least one data source;

parsing contents of the investigation evidence to determine data related to at least one investigation;

transmitting the related data from the at least one data source to a centralized repository;

based on the related data, generating at least one investigation report, using at least one machine learning algorithm, wherein the machine learning algorithm is configured to use a natural language processing model and at least one of an image recognition model or a predictive model to structure the related data in the at least one investigation report; and securely storing the at least one investigation report and the related data in the centralized repository.

21. The method of claim 20, wherein an artificial intelligence algorithm is used to create and track workflows for review of the at least one investigation report.

* * * * *